(12) United States Patent
Eaton et al.

(10) Patent No.: US 6,888,811 B2
(45) Date of Patent: May 3, 2005

(54) COMMUNICATION SYSTEM FOR LOCATION SENSITIVE INFORMATION AND METHOD THEREFOR

(75) Inventors: Eric Thomas Eaton, Lake Worth, FL (US); Von Alan Mock, Boynton Beach, FL (US)

(73) Assignee: Motorola, Inc., Schaumburg, IL (US)

( * ) Notice: Subject to any disclaimer, the term of this patent is extended or adjusted under 35 U.S.C. 154(b) by 268 days.

(21) Appl. No.: 09/961,941

(22) Filed: Sep. 24, 2001

(65) Prior Publication Data

US 2003/0058808 A1 Mar. 27, 2003

(51) Int. Cl.[7] .............................. H04Q 7/24; H04Q 7/34
(52) U.S. Cl. .................. 370/338; 370/401; 455/404.2; 455/414.3; 455/440; 455/456.2
(58) Field of Search ................................ 370/310, 328, 370/338, 400, 401; 455/41.2, 404.2, 414.2, 414.3, 426.1, 440, 456.1, 456.2, 456.3, 456.4, 456.5, 456.6, 457

(56) References Cited

U.S. PATENT DOCUMENTS

| | | | | |
|---|---|---|---|---|
| 5,043,736 A | * | 8/1991 | Darnell et al. | 342/357.1 |
| 5,295,180 A | * | 3/1994 | Vendetti et al. | 455/456.2 |
| 5,568,153 A | * | 10/1996 | Beliveau | 342/357.1 |
| 5,740,541 A | | 4/1998 | Flippo et al. | |
| 5,825,759 A | * | 10/1998 | Liu | 370/331 |
| 5,826,195 A | * | 10/1998 | Westerlage et al. | 455/456.3 |
| 5,850,609 A | * | 12/1998 | Sugarbroad et al. | 455/456.1 |
| 5,991,639 A | * | 11/1999 | Rautiola et al. | 455/414.1 |
| 6,101,178 A | * | 8/2000 | Beal | 370/336 |
| 6,131,037 A | | 10/2000 | Flippo et al. | |
| 6,138,009 A | * | 10/2000 | Birgerson | 455/419 |
| 6,240,069 B1 | * | 5/2001 | Alperovich et al. | 370/260 |
| 6,268,802 B1 | * | 7/2001 | Foladare et al. | 340/7.2 |
| 6,326,926 B1 | * | 12/2001 | Shoobridge et al. | 343/702 |
| 6,493,550 B1 | * | 12/2002 | Raith | 455/422.1 |
| 6,529,722 B1 | * | 3/2003 | Heinrich et al. | 455/404.1 |
| 6,629,151 B1 | * | 9/2003 | Bahl | 709/250 |
| 6,631,271 B1 | * | 10/2003 | Logan | 455/456.1 |
| 6,640,098 B1 | * | 10/2003 | Roundtree | 455/414.2 |
| 2002/0028671 A1 | * | 3/2002 | I' Anson et al. | 455/414 |
| 2002/0035605 A1 | * | 3/2002 | McDowell et al. | 709/206 |

FOREIGN PATENT DOCUMENTS

WO    WO 97/41654    * 11/1997 ............ H04H/1/00

* cited by examiner

*Primary Examiner*—Alpus H. Hsu
(74) *Attorney, Agent, or Firm*—Randi L. Karpinia

(57) ABSTRACT

A portable device (100) communicates with a short range wireless local area network (114) and a wide area communication system (116). The portable device (100) receives a location data from the short range wireless local area network (114). The portable device (100) generates a location sensitive information request to the wide area communication system (116) including the location data received from the short range wireless local area network (114).

12 Claims, 5 Drawing Sheets

COMMUNICATION SYSTEM FOR LOCATION SENSITIVE INFORMATION AND METHOD THEREFOR

BACKGROUND OF THE INVENTION

1. Field of the Invention

This invention relates in general to communication systems and in particular to systems for communication of location sensitive information.

2. Description of the Related Art

Short range wireless communication and personal area networking capability will soon proliferate in common household products as well as mobile business products. Currently many products that have wireless capability are incompatible. Short range wireless local area network (WLAN) protocols such as Bluetooth, HomeRF, and IEEE 802.11 provide an avenue towards compatibility. These short range WLAN protocols operate at lower power and over shorter distances. Further, these short range WLAN protocols generally use unlicensed spectrum and require minimal coordination with the wide area communication protocol also used by the device such as the Global System for Mobile Communications (GSM) and ReFLEX™ protocols.

Short range wireless communication can be, for example, provided using an Infrared Data Association (IrDA) communication standard. IrDA is a point-to-point, narrow angle (30 degree cone), ad-hoc data transmission standard designed to operate over a distance of zero (0) to one (1) meter and at speeds of ninety six hundred (9600) bits per second to sixteen (16) Mega bits per second. Similarly, the short range communication can be provided using a Bluetooth communication standard. Bluetooth is a short range, point-to-multipoint voice and data transfer standard designed to operate over a nominal distance of ten (10) centimeters to ten (10) meters, which can be extended to one hundred (100) meters by increasing transmit power. Bluetooth operates in the 2.4 Gigahertz radio frequency range.

Short range WLAN protocols such as IrDA and Bluetooth technology allow for the replacement of the many proprietary cables that connect one device to another with one universal short range radio link. For example, short range WLAN protocol technology can replace the cumbersome cables used today to connect between a laptop computer and a cellular telephone, between printers, personal digital assistants, desktops, fax machines, keyboards, and joysticks, or between other similar digital devices. Further, appliances such as refrigerators, microwave ovens, dishwashers, laundry washers & dryers, stereos, televisions, digital video disks, video games, lighting, irrigation, cooling and heating systems can also take advantage of such short range radio links.

Potential applications of low power, short range protocols include wireless connection of peripheral devices, high-speed data transfers to desktop computers and wireline networks, and establishment of short range WLANs by the sharing of the same channel between similar wireless communication devices. Typically, in a short range WLAN, one of the devices functions as the master while the others function as slaves. For example, in a Bluetooth system, up to seven active slaves can exist in a WLAN, while many more can remain locked to the same master in a so-called parked state. These parked units cannot be active on the channel, but remain synchronized to the master. The master always controls the channel access for both the active and the parked units. The master in a Bluetooth system controls the traffic across the channel using a polling scheme. Once a short range WLAN has been established, master-slave roles can be exchanged. To avoid collisions, communication between two slaves can only be accomplished through the master unit.

Many short range WLANs such as the Bluetooth system support scatternets. A scatternet is the combination of two or more networks with overlapping coverage area. Each network can only have one master. However, a master in one network can participate as a slave in another and slaves can also participate in different networks on a time division multiplex basis. Networks within a scatternet are not time or frequency synchronized. Each network uses its own hopping sequence.

Recently some portable devices incorporate the capability to determine device location. For example, a wireless communication system can use direction finding equipment at each base station site in order to fix the location of the portable device. The current device location is computed by triangulation when two or more transmitter base stations receive the same signal. Thus, when two or more transmitter base stations cannot receive the same signal the location of the portable device cannot be accurately determined. In addition, even when the two or more base stations can receive the same signal the system still has limited ability to accurately determine the location of the portable device due to the random propagations signaling paths between the portable device and the base station receivers.

Similarly, the portable device can include a Global Positioning System (GPS) receiver for determining its current location. The Global Positioning System (GPS) is a world-wide radio-navigation system formed from a constellation of twenty four (24) satellites and their ground stations. GPS uses these "man-made stars" as reference points to calculate positions accurate to a matter of meters. The GPS receiver uses the satellites in space as reference points for locations here on earth. The GPS receiver measures distance using the travel time of radio signals. The GPS receiver has very accurate timing to measure travel time. Along with distance, the GPS receiver knows exactly where the satellites are in space. Finally, the GPS receiver corrects for any delays the signal experiences as it travels through the atmosphere. Disadvantageous to the portable device is the added cost and size requirements associated with the inclusion of on-board location determining components Typically, a short range WLAN determines the location of a portable device by pre-knowledge of the location of a fixed smart network access point or the knowledge of the location limitations of the short range WLAN network that the portable device is utilizing to communicate through. Therefore, the short range WLAN does not need to request the present location from the portable device to provide location sensitive information. For example, the short range WLAN can be a private network with firewalls that have predetermined smart network access points located in an office building. Therefore, getting information with regards to vending machine locations or directions to a meeting room within the building from a current device location can be done within such a private network without the portable device having knowledge of its current location.

One disadvantage of today's communication systems is that the local area communication system alone has the location data. Therefore, only location sensitive information requested through that local area communication system can be provided. The portable device does not have the capability of receiving location sensitive information independent of the local area communication system. Disadvantageously to the device user, the short range WLAN could be void of any location sensitive information for the surrounding area, which otherwise could be provided by a wide area communication system. For example, although directions to a meeting room from an office can be given from the short range WLAN within an office building, the daily lunch specials and directions to the local seafood restaurant may not be available to be retrieved from that same short range WLAN located behind the firewall.

Portable devices that do not have on-board location determining capability either cannot use location sensitive software applications or require a user to enter the location data manually. (i.e.: by entering a street address and city, or a zip code). For example, this lack of on-board location capability can be due to either the absence of a hardware or software solution or can be due to the inability to access information required by the solution to enable location determination. Manual entry of location data can be problematic, especially when the user has traveled away from his home geographic area.

Dedicated short range WLAN devices typically contain a single method of communication capabilities used to communicate within the short range WLAN. These devices probably do not need to know their location as the network from which they can receive information can have accurate knowledge of where they are located. Therefore, it would be inefficient use of the short range WLAN bandwidth to provide such devices with their current location, as it may not be able to be used by the device.

What is needed is a system and method for facilitating the identification and communication of location sensitive information for a portable device that has multiple communication methods without requiring the use by the portable device of on-board location determining capability. (For example, when the portable device on-board location determining capability is not available due to either the absence of a hardware or software solution or due to the inability to access information required by the solution to enable location determination.) Further, what is needed is an efficient low cost system and method for location sensitive information access independent of a particular local area communication network or system.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF THE PREFERRED EMBODIMENT(S)

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention.

Figure 1:
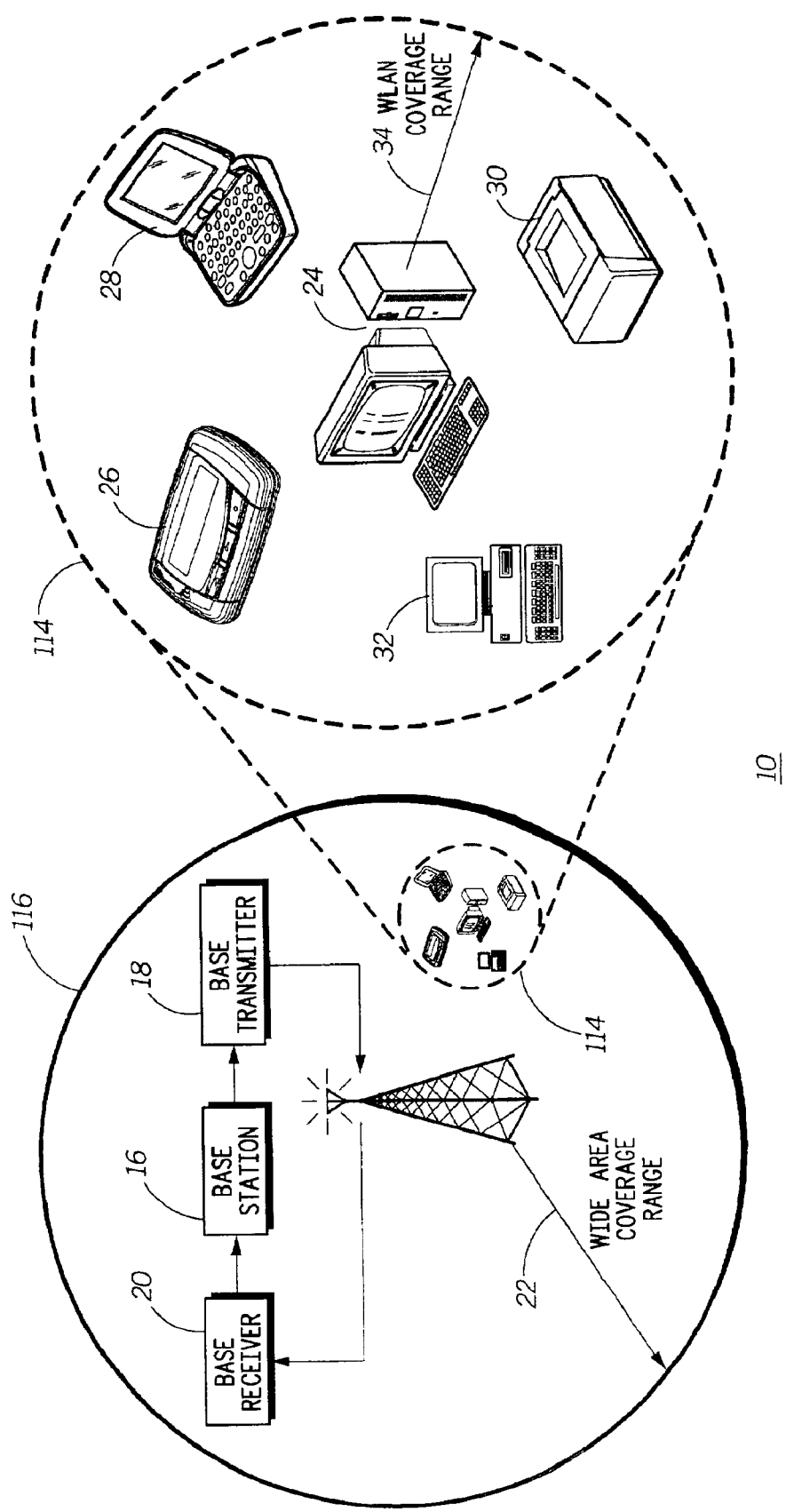
FIG. 1 is a block diagram of a communication system having a short range wireless local area network and a wide area communication system.

Referring to FIG. 1, a communication system 10 having a short range WLAN 114 and a wide area communication system 116 is illustrated. The wide area communication system 116 as shown in FIG. 1 includes a base station 16 with a co-located base transmitter 18 and a base receiver 20 covering a wide area coverage range 22 as shown. A typical wide area communication system could, for example, utilize Motorola's ReFLEX™ messaging protocol.

It will be appreciated by one of ordinary skill in the art that the wide area communication system 116, in accordance with the present invention, can function utilizing any wireless RF channel, for example, a one or two-way pager channel, a mobile cellular telephone channel, or a mobile radio channel. Similarly, it will be appreciated by one of ordinary skill in the art that the wide area communication system 116 can function utilizing other types of communication channels such as infrared channels, audio channels, and local area networks. In the following description, the term "wide area communication system" refers to any of the systems mentioned above or an equivalent.

The communication system 10 of FIG. 1 includes a plurality of devices for operation within the communication system 10. Preferably, each of the devices (i.e.: a personal computer 24, a wireless communication device 26, a personal digital assistant 28, a printer 30, and a computer 32) is a device using a short range WLAN protocol, such as Bluetooth technology to communicate within the WLAN coverage range 34 of the short range WLAN 114. It will be appreciated by one of ordinary skill in the art that the short range WLAN protocol, in accordance with the present invention, can function utilizing any short range wireless protocol such as IrDA, HomeRF, and IEEE 802.11. Further it will be appreciated by one of ordinary skill in the art that some of the devices, for example the wireless communication device 26, can also operate on the wide area communication system 116.

Figure 2:
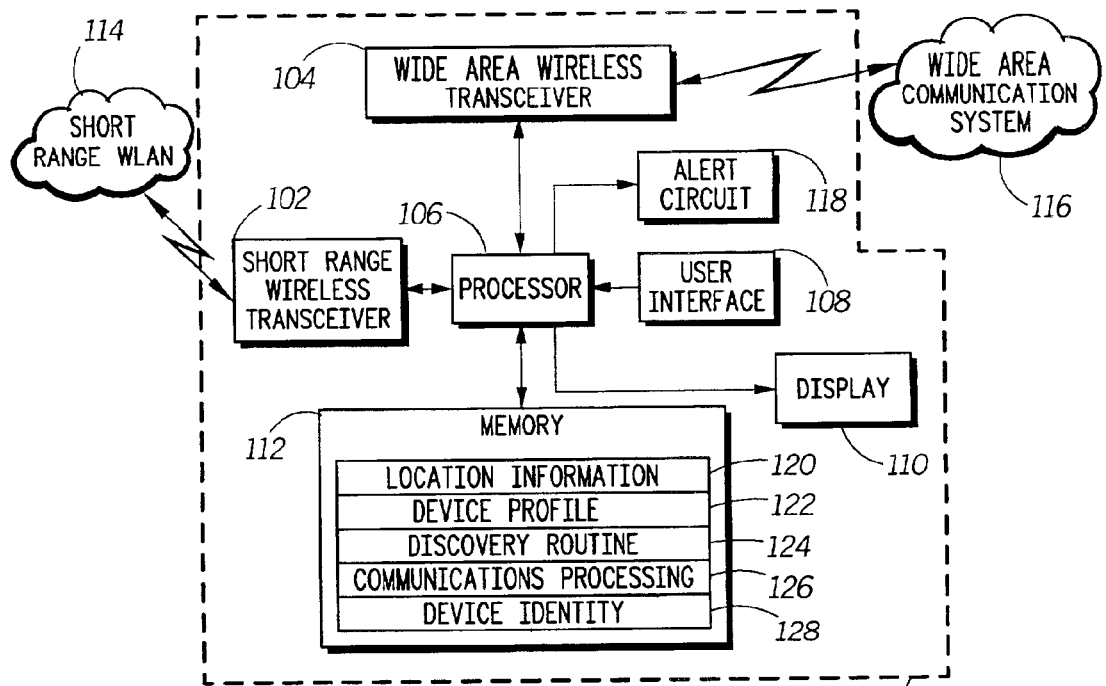
FIG. 2 is an electrical block diagram of a portable device for use within the communication system of FIG. 1 in accordance with the present invention.

FIG. 2 is an electrical block diagram of a preferred embodiment of a portable device 100 for use within the communication system 10 of FIG. 1 in accordance with the present invention. It will be appreciated by one of ordinary skill in the art that the portable device 100, in accordance with the present invention, can be the personal computer 24, the wireless communication device 26, the personal digital assistant 28, the printer 30, or the computer 32 of FIG. 1. Further, it will be appreciated by one of ordinary skill in the art that the portable device 100, in accordance with the present invention, can be a mobile cellular telephone, a mobile radio data terminal, a mobile cellular telephone having an attached data terminal, or a two way pager, such as the "Pagewriter 2000X" manufactured by Motorola Inc. of Schaumburg, Ill. Further, the portable device 100 can be a small portable personal computer having wireless communications capability. In the following description, the term "portable device" refers to any of the devices mentioned above or an equivalent.

The portable device 100 preferably comprises a short range wireless transceiver 102, a wide area wireless transceiver 104, a processor 106, a user interface 108, a display 110, an alert circuit 118, and a memory 112.

The short range wireless transceiver 102 provides communication means for the portable device 100 to communicate using a short range WLAN protocol, such as Bluetooth technology, with other similar devices within the short range WLAN 114. The short range wireless transceiver 102 employs conventional demodulation techniques for receiving the communication signals from the short range WLAN 114. Further, the short range wireless transceiver 102 is coupled to the processor 106 and is responsive to commands from the processor 106. When the short range wireless transceiver 102 receives a command from the processor 106, the short range wireless transceiver 102 sends a signal to the short range WLAN 114. The short range wireless transceiver 102 includes components well known by one of ordinary skill in the art, such as filters, mixers, small-signal amplifiers, a demodulator, and other known elements necessary to receive, demodulate, decode, and transmit information-bearing signals in accordance with the short range WLAN protocol.

The wide area wireless transceiver 104 provides communication means for the portable device 100 to communicate using a wide area communication protocol within the wide area communication system 116. The wide area wireless transceiver 104 employs conventional demodulation techniques for receiving the communication signals from the wide area communication system 116. Further, the wide area wireless transceiver 104 is coupled to the processor 106 and is responsive to commands from the processor 106. When the wide area wireless transceiver 104 receives a command from the processor 106, the wide area wireless transceiver 104 sends a signal to the wide area communication system 116. The wide area wireless transceiver 104 includes components well known by one of ordinary skill in the art, such as filters, mixers, small-signal amplifiers, a demodulator, and other known elements necessary to receive, demodulate, decode, and transmit information-bearing signals in accordance with the wide area communication protocol used by the wide area communication system 116.

The portable device 100 further comprises the processor 106 coupled to the short range wireless transceiver 102 and further coupled to the wide area wireless transceiver 104 for controlling the short range wireless transceiver 102 and the wide area wireless transceiver 104. The processor 106 utilizes conventional signal processing techniques for processing received messages. Preferably, the processor 106 is similar to the MC68328 micro controller manufactured by Motorola, Inc. of Schaumburg, Ill. It will be appreciated by one of ordinary skill in the art that other similar processors can be utilized for the processor 106, and that additional processors of the same or alternative type can be utilized as required to handle the processing requirements of the processor 106.

The processor 106 is preferably coupled to the display 110. Upon receipt of a message, the processor 106 communicates a command signal to the display 110 to generate a visual notification of the receipt and storage of the message. When the display 110 receives the command signal from the processor 106 that the message has been received and stored, a message indication is displayed. The message indication, for example can be the activation of one of a plurality of message icons on the display 110. Further, the processor 106 communicates a command signal to the display 110 to notify the device user of any other information of interest to the device user such as an approximated device location. Upon receipt of the command signal from the processor 106, the display 110 displays the required information such as the approximated device location for visual notification to the device user. The display 110 can be, for example, a liquid crystal display utilized to display text. It will be appreciated by one of ordinary skill in the art that other similar displays such as dot matrix displays can be utilized for the display 110.

The processor 106 is preferably further coupled to and responsive to the user interface 108. The user interface 108 can be a keypad, one or more buttons, a voice response interface, or some other similar method of interfacing with a manual response initiated by the device user of the portable device 100. Upon receipt of a signal from the user interface 108, the processor 106 performs an associated function. For example, upon visual notification of an approximated device location on the display 110, the device user, via the user interface 108 can accept or reject the displayed approximated device location.

The processor 106 is preferably further coupled to the alert circuit 118. Upon receipt and processing of a message, the processor 106 preferably generates a command signal to the alert circuit 118 as a notification that the message has been received and stored. Further, the processor 106 can generate a command signal to the alert circuit 118 for any other purpose as required by the portable device 100. For example, the command signal from the processor 106 to the alert circuit 118 can be generated to inform the device user of a change in device location, of leaving the short range WLAN coverage area 34 (see FIG. 1), or of the availability of location sensitive information. The alert circuit 118 can include a speaker (not shown) with associated speaker drive circuitry capable of playing melodies and other audible alerts, a vibrator (not shown) with associated vibrator drive circuitry capable of producing a physical vibration, or one or more LEDs (not shown) with associated LED drive circuitry capable of producing a visual alert. It will be appreciated by one of ordinary skill in the art that other similar alerting means as well as any combination of the audible, vibratory, and visual alert outputs described can be used for the alert circuit 118.

To perform the necessary functions of the portable device 100, the processor 106 is coupled to the memory 112, for storing information and software for programming the processor 106 in accordance with the present invention. The memory 112 preferably includes a random access memory (RAM), a read-only memory (ROM), and an electrically erasable programmable read-only memory (EEPROM)(not shown). In a preferred embodiment, the memory 112 comprises a location information memory 120, a device profile memory 122, a discovery routine memory 124, a communications processing memory 126, and a device identity memory 128.

The portable device 100 preferably stores a plurality of location data in the location information memory 120 of the memory 112. The plurality of location data can be obtained by the portable device 100 via a command from the processor 106 to the short range wireless transceiver 102 requesting from the short range WLAN 114 the location coordinates for the portable device 100. Alternatively, the plurality of location data such as the device location coordinates can be received from the short range WLAN 114 automatically without request from the portable device 100. For example, the short range WLAN 114 can send the plurality of location data to the portable device 100 as a message using the short range WLAN protocol or as an attachment to another message, (i.e. as part of a service discovery process) using the short range WLAN protocol.

The location coordinates are then stored as the plurality of location data in the location information memory 120. The plurality of location data, for example, can include a current location, a current time, as well as previous locations and associated previous times. It will be appreciated by one of ordinary skill in the art that the current and previous times can be determined by the short range WLAN 114 and transmitted to the portable device 100 with the other location data. Alternatively, the portable device 100 can include a clock (not shown) for calculation of the current time or previous times. In a preferred embodiment of the present invention, the processor 106 receives location data of the short range WLAN 114 from the short range WLAN 114 and stores the location data in the location information memory 120. Using the stored location data, the processor 106 can approximate the location of the portable device 100.

Advantageously to the portable device and device user, upon receipt and storage of the location data in the location information memory 120, the portable device 100 can request location sensitive information from not only the short range WLAN 114, but also from any other communication system independent of the short range WLAN 114 such as the wide area communication system 116. The location sensitive information, for example, can be a listing of restaurants, gas stations, or community parks in a particular city. The location sensitive information also can be a listing of offices within a particular office building. It will be appreciated by one of ordinary skill in the art that the locations sensitive information can be any of the items mentioned above or an equivalent. The location sensitive information can be obtained by the short range WLAN 114 or the wide area communication system 116 via the Internet or via a database stored in any other server connected to the short range WLAN 114 or the wide area communication system 116. Further, the location sensitive information can be obtained by the short range WLAN 114 or the wide area communication system 116 by requesting the information using the respective protocols of each system to other devices connected to each system. It will be appreciated by one of ordinary skill in the art that the location sensitive information can be obtained from any of the sources mentioned above or an equivalent.

The benefit of this method is the ability for the portable device 100 to obtain its location data from the short range WLAN 114 and then obtain location sensitive information associated with that particular location from the short range WLAN 114, the wide area communication system 116, and/or any other independent communication network which would have otherwise not have access to such information. This inability to access by the portable device 100 can be due to not having on-board location determining capability, due to the need to save the additional cost for such a solution, due to the inability to access information required by the solution that enable location determination, or any other equivalent reason.

In one embodiment, the plurality of location data is updated periodically as the portable device 100 travels among a plurality of locations. For example, a person walking through an airport can obtain information of the location of desired services, offices, restaurants, clubs, restrooms, gates, and the like within the other parts of the airport. An application on the person's portable device preferably utilizes the location data such as location coordinates received from each smart network access point he passes while in motion to update the location data for the portable device 100 and display the updated location data on the display 110 of the portable device.

The portable device 100 stores device profile information in the device profile memory 122 of the memory 112. The device profile information, for example, can include the device battery life, device battery capacity, device processing power, and access to both short range WLANs and wide area communication systems. The device profile information can further include dial up networking, facsimile, printing, TCS-binary (Telephony Control/signaling for phones), TCS-AT, Personal Area Networking (PAN), audiovisual (A/V), OBEX (Object Exchange protocol), and still imagery. Preferably, a profile is a set of rules that are followed to insure interoperability for that profile. For example a PAN profile can require PPP (Point to Point Protocol) running over IP (Internet Protocol). It will be appreciated by one of ordinary skill in the art that the device profile information of the portable device 100, in accordance with the present invention, can be any of the technology enablers mentioned above or an equivalent.

The memory 112 further includes the discovery routine memory 124. The discovery routine memory 124 stores a program for controlling the operation of the processor 106 in decoding a service discovery protocol. For example, when the short range WLAN uses a Bluetooth protocol, the service discovery protocol (SDP) within Bluetooth provides a means for applications programmed into a device to discover which services are available and to determine the characteristics of those available services. Within the service discovery protocol a mechanism is provided that incrementally discovers information about the services provided by a device. This is intended to minimize the quantity of data that must be exchanged in order to determine that a client does not need a particular service. Bluetooth's service discovery mechanism is self-contained and therefore requires no registration with a central server/database. After the initial connection and setup the portable device 100 will do a service request to the short range WLAN 114. The service discovery protocol involves communication between a SDP client and SDP server within the short range WLAN 114. The SDP server maintains a list of service records that describe the characteristics of services associated with the SDP server. Each service record contains information about a single service. A client may retrieve information from a service record maintained by the SDP server by issuing a SDP request. A Global Positioning System (GPS) record can be created so that this information could be provided to a SDP client upon request. The record can include longitude, latitude, alleviation and time derived from the GPS satellites or other source. The SDP record information can be data of the access point and would be stored locally. It will be appreciated by one of ordinary skill in the art that the service discovery protocol can be the service discovery protocol (SDP) within Bluetooth or any equivalent service discovery protocol used by the short range WLAN protocol of the short range WLAN 114.

The memory 112 further includes the communications processing memory 126 for programming the processor 106 to process communications in accordance with the short range WLAN protocol used by the short range WLAN 114 and to process communications in accordance with the wide area communications protocol used by the wide area communication system 116.

The memory 112 further includes the device identity 128 for uniquely identifying the portable device 100. The device identity 128 assigned to the portable device 100 preferably is a unique selective call address in the wide area communication system 116 and also in the short range WLAN 114. It will be appreciated by one of ordinary skill in the art that other portable devices assigned for use in wide area communication system 116 and in the short range WLAN 114 also have a device identity assigned thereto, which preferably also comprise a unique selective call address. The device identity 128 enables the transmission of a message from the wide area communication system 116 and/or the short range WLAN 114 only to the portable device having the specified device identity; and identifies the messages and responses received by the wide area communication system 116 and/or by the short range WLAN 114 from the portable device 100 with the device identity 128. In one embodiment, the portable device also has a pin number assigned thereto, the pin number being associated with a telephone number within a Public Switched Telephone Network (PSTN). A list of assigned pin numbers and correlated telephone numbers for the portable devices is stored in a terminal in the form of a subscriber database for use by the wide area communication system 116 and/or the short range WLAN 114.

Figure 3:
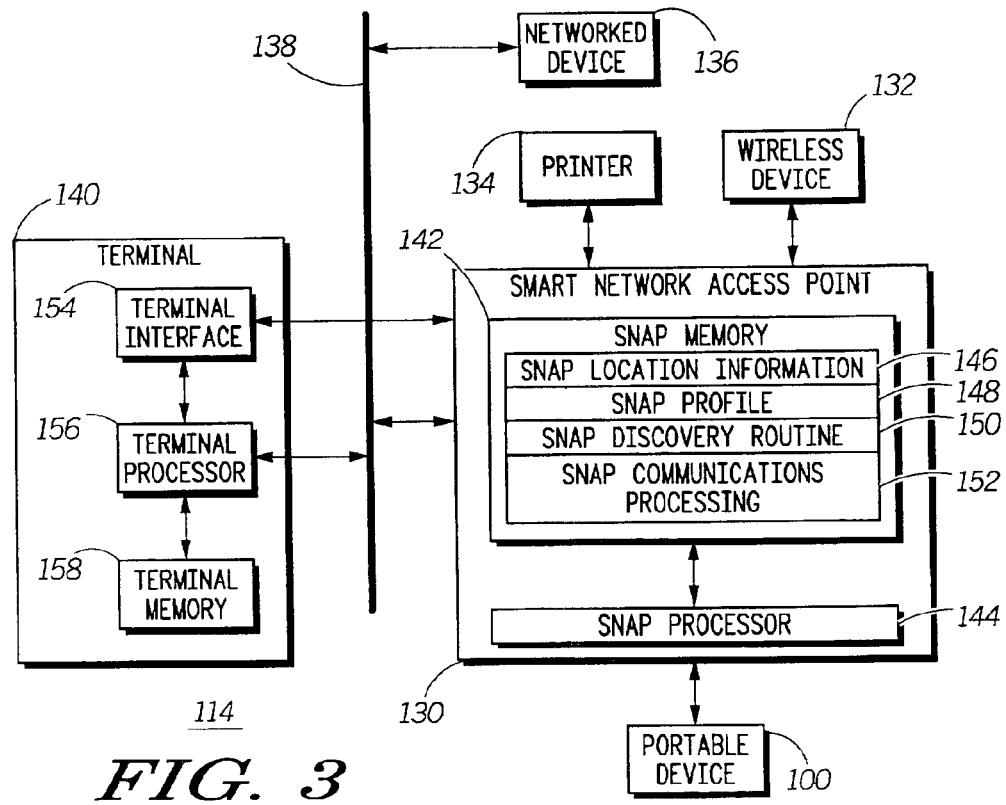
FIG. 3 is an electrical block diagram of a short range wireless local area network for use in the communication system of FIG. 1 in accordance with the present invention.

FIG. 3 illustrates a preferred embodiment of the short range WLAN 114 of FIG. 1 in accordance with the present invention. The short range WLAN 114 of FIG. 3 includes the portable device 100, a smart network access point 130, a wireless device 132, a printer 134, a networked device 136, a network backbone 138, and a terminal 140.

As illustrated in FIG. 3, the portable device 100 is coupled to the smart network access point 130. Preferably, the smart network access point 130 functions as a master and the plurality of devices such as the portable device 100, the printer 134, and the wireless device 132, each coupled to the smart network access point 130, function as slaves. It will be appreciated by one of ordinary skill in the art that each of the plurality of devices in accordance with the present invention, can be a mobile cellular telephone, a mobile radio data terminal, a mobile cellular telephone having an attached data terminal, or a two way pager, such as the "Pagewriter 2000X" manufactured by Motorola Inc. of Schaumburg, Ill. Similarly, each of the plurality of devices, in accordance with the present invention, can be a printer, a personal computer, or a personal digital assistant. Further, the plurality of devices can include a small portable personal computer having wireless communications capability. In the following description, the term "device" refers to any of the devices mentioned above or an equivalent. It will be further appreciated by one of ordinary skill in the art that alternatively one or more of the plurality of devices can take the role of the smart network access point 130.

The smart network access point 130 can be a bridge between the short range WLAN 114 and the wide area communication network 116. Similarly, the smart network access point 130 can be a bridge between a plurality of short range WLANs in a fast changing mobile environment. One device within the short range WLAN 114 preferably includes a GPS receiver or a similar means to determine location that can be broadcasted to other devices on the move. Alternatively, the smart network access point 130 can be a Bluetooth telephone offering dial up networking where GPS coordinates are communicated to the portable device 100 in the service record immediately after connection. An application on the portable device 100 can then utilize the data to format a location query to obtain location sensitive information. Further, the smart network access point 130 can be a facsimile machine that is Bluetooth enabled. The device then can send a facsimile, including the GPS coordinates received from the service discovery record contained with the facsimile machine. This data can be used to notify the recipient of the device's location. It will be appreciated by one of ordinary skill in the art that the smart network access point 130 in accordance with the present invention can be any of the above or an equivalent.

The smart network access point (SNAP) 130 preferably includes a SNAP memory 142 and a SNAP processor 144. The SNAP processor 144 utilizes conventional signal processing techniques for processing received information. Preferably, the SNAP processor 144 is similar to the MC68328 micro controller manufactured by Motorola, Inc. of Schaumburg, Ill. It will be appreciated by one of ordinary skill in the art that other similar processors can be utilized for the SNAP processor 144, and that additional processors of the same or alternative type can be utilized as required to handle the processing requirements of the SNAP processor 144.

To perform the necessary functions of the smart network access point 130, the SNAP processor 144 is coupled to the SNAP memory 142, for storing information, and software for programming the SNAP processor 144 in accordance with the present invention. The SNAP memory 142 preferably includes a random access memory (RAM), a read-only memory (ROM), and an electrically erasable programmable read-only memory (EEPROM)(not shown). In a preferred embodiment, the SNAP memory 142 comprises a SNAP location information memory 146, a SNAP profile memory 148, a SNAP discovery routine memory 150, and a SNAP communications processing memory 152.

The smart network access point 130 preferably stores a plurality of location data in the SNAP location information memory 146 of the SNAP memory 142. The plurality of location data can be obtained by the smart network access point 130 for example by the SNAP processor 144 of the smart network access point 130 calculating the location position utilizing a plurality of GPS signals broadcast from a GPS system in a manner well known in the art. Alternatively, the location data comprises manually entered location coordinates of the short range WLAN 114. Alternatively, the smart network access point 130 can obtain location data from a wired access point such as the Internet. It will be appreciated by one of ordinary skill in the art that other methods of obtaining location data by the smart network access point 130 can be utilized in accordance with the present invention.

The location data stored in the SNAP location information memory 146 preferably includes location coordinates for the smart network access point 130. In accordance with the present invention, the SNAP processor 144 sends registration information, including the location coordinates of the smart network access point 130 to the portable device 100, to allow the portable device access to the short range WLAN 114. The portable device 100 further utilizes the location coordinates of the smart network access point 130 to approximate the location of the portable device 100.

The smart network access point 130 stores SNAP profile information in the SNAP profile memory 148 of the SNAP memory 142. The SNAP profile information can include the device battery life, device battery capacity, device processing power, and access to both a plurality of short range WLANs and wide area communication systems. The SNAP profile information can further include dial up networking, facsimile, printing, TCS-binary, TCS-AT, Personal Area Networking (PAN), audiovisual (A/D), OBEX, and still imagery. It will be appreciated by one of ordinary skill in the art that the SNAP profile information, in accordance with the present invention, can be any of the technology enablers mentioned above or an equivalent.

The SNAP memory 142 further includes the SNAP discovery routine memory 150. The SNAP discovery routine memory 150 for example stores a program for controlling the operation of the SNAP processor 144 in decoding a service discovery protocol. For example, when the short range WLAN uses a Bluetooth protocol, the service discovery protocol (SDP) within Bluetooth provides a means for applications within a device to discover which services are available and to determine the characteristics of those available services. It will be appreciated by one of ordinary skill in the art that the service discovery protocol can be the service discovery protocol (SDP) within Bluetooth or any equivalent service discovery protocol used by the short range WLAN protocol of the short range WLAN 114.

The SNAP memory 142 further includes the SNAP communications processing memory 152 for programming the SNAP processor 144 to process communications in accordance with the short range WLAN protocol used by the short range WLAN 114.

The smart network access point 130 is coupled to the network backbone 138. In a preferred embodiment, the smart network access point 130 provides network access for the wireless device 132 with on-board location-determining capability, e.g., a Wireless Access Protocol (WAP) enabled mobile telephone with built-in GPS. Also coupled to the network backbone 138 is the terminal 140. The terminal 140 includes a terminal interface 154, a terminal processor 156, and a terminal memory 158.

The terminal processor 156 processes the communications of the short range WLAN 114 and controls the short range WLAN 114. In a preferred embodiment, the terminal processor 156 cooperates with the smart network access point 130 to provide access to the communication network by the wireless device 132, which has on-board location-determining capability, to request location coordinates of the wireless device 132, to receive the location coordinates from the wireless device 132, and to store the location coordinates in terminal memory 158 to which the terminal processor 156 is coupled. The terminal processor 156 utilizes conventional signal processing techniques for processing received information. Preferably, the terminal processor 156 is similar to the MC68328 micro controller manufactured by Motorola, Inc. of Schaumburg, Ill. It will be appreciated by one of ordinary skill in the art that other similar processors can be utilized for the terminal processor 156, and that additional processors of the same or alternative type can be utilized as required to handle the processing requirements of the terminal processor 156.

The terminal processor 156 is preferably coupled to the terminal interface 154 for providing control and programming of the terminal processor 156 by an operator. The terminal interface 154 for example can be a conventional keypad and display combination. Alternatively, the terminal 140 can be a network router or bridge that is remotely controlled and does not have its own keyboard. It will be appreciated by one of ordinary skill in the art that other similar terminal types can be utilized to handle the requirements of the terminal 156.

To perform the necessary functions of the terminal 140, the terminal processor 156 is coupled to the terminal memory 158, for storing information and software for programming the terminal processor 156 in accordance with the present invention. The terminal memory 158 preferably includes a random access memory (RAM), a read-only memory (ROM), and an electrically erasable programmable read-only memory (EEPROM)(not shown).

Figure 4:
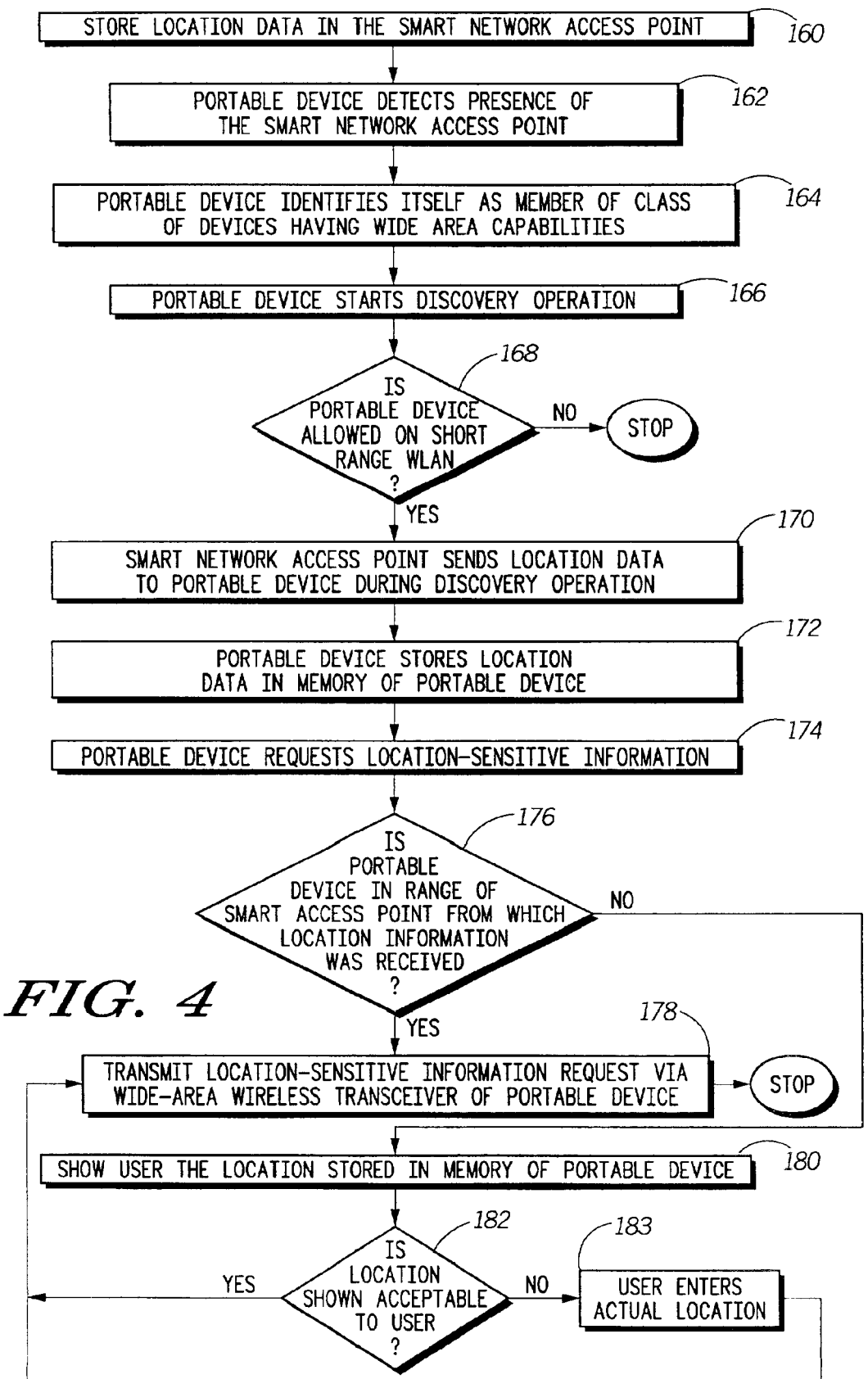
FIGS. 4–6 are flow diagrams illustrating the operation of the communication system of FIG. 1 in accordance with the present invention.

FIG. 4 is a flow diagram illustrating one embodiment of the operation of the communication system of FIG. 1 in accordance with the present invention. The flow diagram of FIG. 4 describes interactions between the short range WLAN 114 and the portable device 100. The process begins with Step 160 wherein a plurality of location data is stored in the SNAP location information memory 146 of the smart network access point 130. The plurality of location data can be obtained by the smart network access point 130 for example by the SNAP processor 144 of the smart network access point 130 calculating the location position utilizing a plurality of GPS signals broadcast from a GPS system in a manner well known in the art. Alternatively, the location data comprises manually entered location coordinates of the smart network access point 130 or of the short range WLAN 114. It will be appreciated by one of ordinary skill in the art that other methods of obtaining location data by the smart network access point 130 can be utilized in accordance with the present invention.

Next, in Step 162, the portable device 100 detects the presence of the smart network access point 130. Next, in Step 164, the portable device 100 identifies itself to the smart network access point 130 as a member of a class of devices having wide area communication capabilities. For example, the portable device 100 identifies itself as having the capability to communicate within the wide area communication system 116 of FIG. 1. Next, in Step 166, the portable device 100 starts the discovery operation using the discovery routine stored in the discovery routine memory 124 of the portable device 100. Next, in Step 168, the process determines whether the portable device 100 is allowed on the short range WLAN 114. When the portable device 100 is not allowed on the short range WLAN 114, the process stops. Alternatively, when the portable device 100 is allowed on the short range WLAN 114, the process moves to Step 170 wherein the smart network access point 130 sends location data to the portable device 100 during the discovery operation. Next, in Step 172, the portable device 100 stores the location data received in Step 170 in the location information memory 120 of the portable device 100. Next, in Step 174, the portable device 100 requests location sensitive information. Next, in Step 176, the process determines whether the portable device 100 is in the range of the smart network access point 130 from which the location data was received. When the portable device 100 is in the range of the smart network access point 130 from which the location data was received, the process moves to Step 178 wherein the portable device 100 transmits a location sensitive information request via the wide area wireless transceiver 104 to the wide area communication system 116. The process then stops. When the portable device 100 is not in the range of the smart network access point 130 from which the location data was received, the process moves to Step 180 wherein the location stored in the location information memory 120 is shown to the user of the portable device 100. For example, the location data can be displayed on the display 110. The process then moves to Step 182 wherein it is determined whether the location shown is acceptable to the user. For example, the user can accept the location using the user interface 108 of the portable device 100. When the location shown is not acceptable to the user, in Step 183, the user can manually enter a current location. Next, in Step 178 the portable device 100 transmits a location sensitive information request via the wide area wireless transceiver 104 to the wide area communication system 116. The process then stops. When the location shown is acceptable to the user in Step 182, the process moves to Step 178 wherein the portable device 100 transmits a location sensitive information request via the wide area wireless transceiver 104 to the wide area communication system 116. The process then stops.

In the manner described herein above, the portable device 100 can take advantage of the benefits of location sensitive software applications by obtaining location data from the short range WLAN 114.

Figure 5:
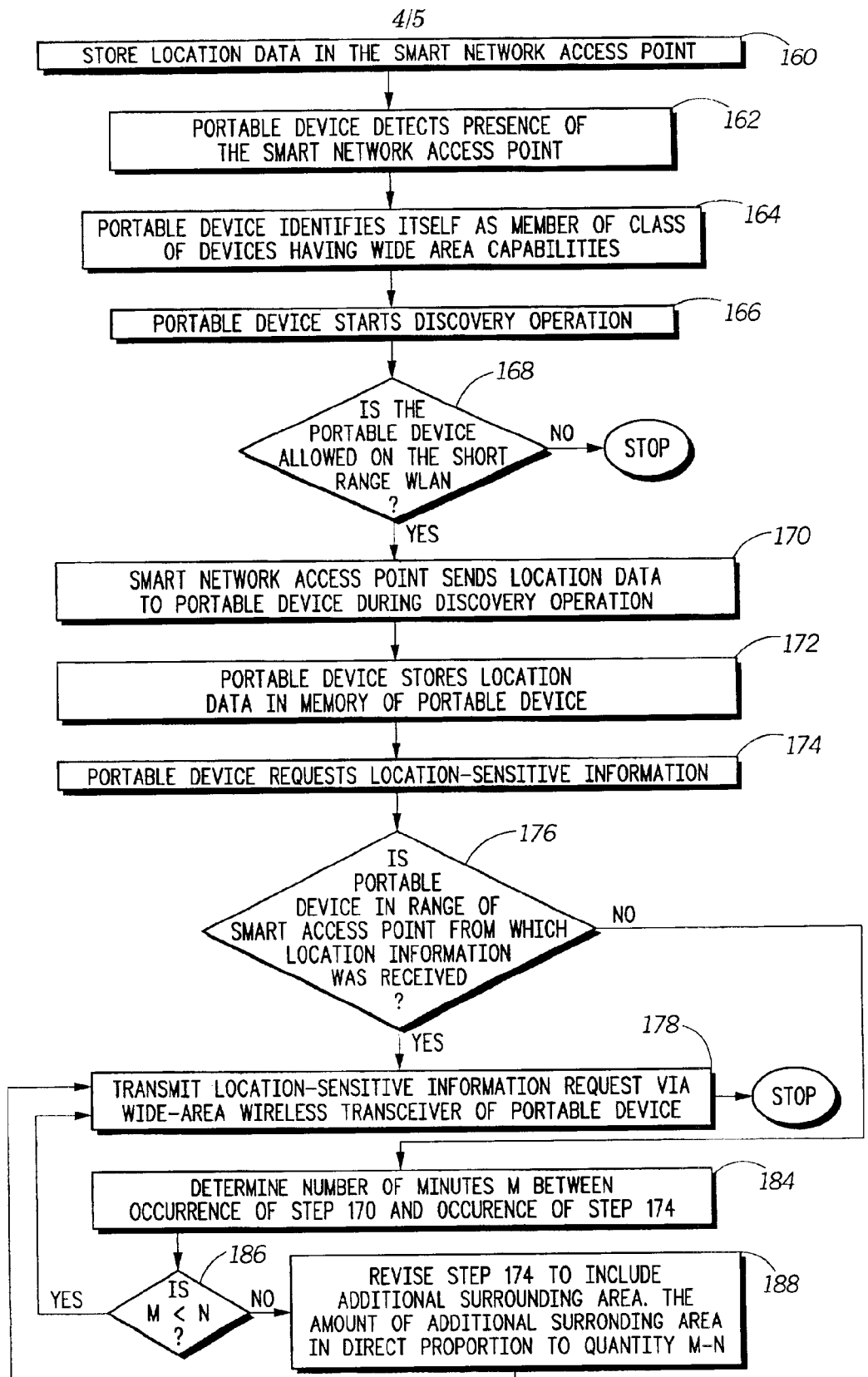

FIG. 5 is a flow diagram illustrating an alternative embodiment of the operation of the communication system of FIG. 1 in accordance with the present invention. The flow diagram of FIG. 5 describes interactions between the short range WLAN 114 and the portable device 100. The process begins with Step 160 wherein a plurality of location data is stored in the SNAP location information memory 146 of the smart network access point 130. The plurality of location data can be obtained by the smart network access point 130 for example by the SNAP processor 144 of the smart network access point 130 calculating the location position utilizing a plurality of GPS signals broadcast from a GPS system in a manner well known in the art. Alternatively, the location data comprises manually entered location coordinates of the smart network access point 130 or of the short range WLAN 114. It will be appreciated by one of ordinary skill in the art that other methods of obtaining location data by the smart network access point 130 can be utilized in accordance with the present invention.

Next, in Step 162, the portable device 100 detects the presence of the smart network access point 130. Next, in Step 164, the portable device 100 identifies itself to the smart network access point 130, as a member of a class of devices having wide area communication capabilities. For example, the portable device 100 identifies itself as having the capability to communicate within the wide area communication system 116 of FIG. 1. Next, in Step 166, the portable device 100 starts the discovery operation using the discovery routine stored in the discovery routine memory 124 of the portable device 100. Next, in Step 168, the process determines whether the portable device 100 is allowed on the short range WLAN 114. When the portable device 100 is not allowed on the short range WLAN 114, the process stops. Alternatively, when the portable device 100 is allowed on the short range WLAN 114, the process moves to Step 170 wherein the smart network access point 130 sends location data to the portable device 100 during the discovery operation. Next, in Step 172, the portable device 100 stores the location data received in Step 170 in the location information memory 120 of the portable device 100. Next, in Step 174, the portable device 100 requests location sensitive information. Next, in Step 176, the process determines whether the portable device 100 is in the range of the smart network access point 130 from which the location data was received. When the portable device 100 is in the range of the smart network access point 130 from which the location data was received, the process moves to Step 178 wherein the portable device 100 transmits a location sensitive information request via the wide area wireless transceiver 104 to the wide area communication system 116. The process then stops.

When the portable device 100 is not in the range of the smart network access point 130 from which the location data was received, the process moves to Step 184 wherein the time differential "M" between the occurrence of Step 170 (smart network access point 130 sends location data) and the occurrence of Step 174 (portable device 100 requests location sensitive information) is determined. Next, in Step 186, the time differential "M" is compared to a predetermined number "N". The predetermined number "N" is preferably a differential in time wherein the location of the portable device 100 has a lower confidence of being accurate, and therefore the location sensitive information may not be as accurate for the device user when the device user (and therefore portable device 100) is in motion. When the time differential "M" is less than the predetermined number "N", the process moves to Step 178 wherein the portable device 100 transmits a location sensitive information request via the wide area wireless transceiver 104 to the wide area communication system 116. It will be appreciated by one of ordinary skill in the art that the location sensitive information request of Step 178 can include the time differential "M" or alternatively can include an elapsed time from a previous location. (not shown) The process then stops. It will be appreciated by one of ordinary skill in the art that the wide area communication system 116, in response to receiving the location sensitive information request preferably generates the location sensitive information and transmits the location sensitive information to the portable device 100. In one embodiment, the wide area communication system 116 uses the received time differential to determine the location sensitive information in response to receiving the location sensitive information request including the time differential from the portable device 100. (not shown) In an alternate embodiment, the wide area communication system 116 uses the received elapsed time from a previous location to determine the location sensitive information in response to receiving the location sensitive information request including the elapsed time from a previous location. (not shown)

When the time differential "M" is not less than the predetermined number "N", the process moves to Step 188 wherein the location sensitive information request is revised to include a surrounding area in direct proportion to the difference between "M" and "N". For example, If M is five (5) minutes and N is ten (10) minutes then the request for local restaurants would be expanded from a default request of a one (1) mile radius to a request of a five (5) miles radius because the user may have moved a few miles over the past five (5) minutes and a one (1) mile radius from the previously known location may yield no valuable results for the new location of the portable device user. It will be appreciated by one of ordinary skill in the art that alternatively, in Step 188, the surrounding area can be a geographic area characterized by a zip code, county borders, city borders or any other equivalent geographic area. (not shown) Next, the process moves to Step 178 wherein the portable device 100 transmits a location sensitive information request via the wide area wireless transceiver 104 to the wide area communication system 116. It will be appreciated by one of ordinary skill in the art that the location sensitive information request of Step 178 can include the time differential "M" or alternatively can include an elapsed time from a previous location. (not shown) The process then stops.

In the manner described herein above, the portable device 100, advantageously can take advantage of the benefits of location sensitive software applications by obtaining location data from the short range WLAN 114.

Figure 6:
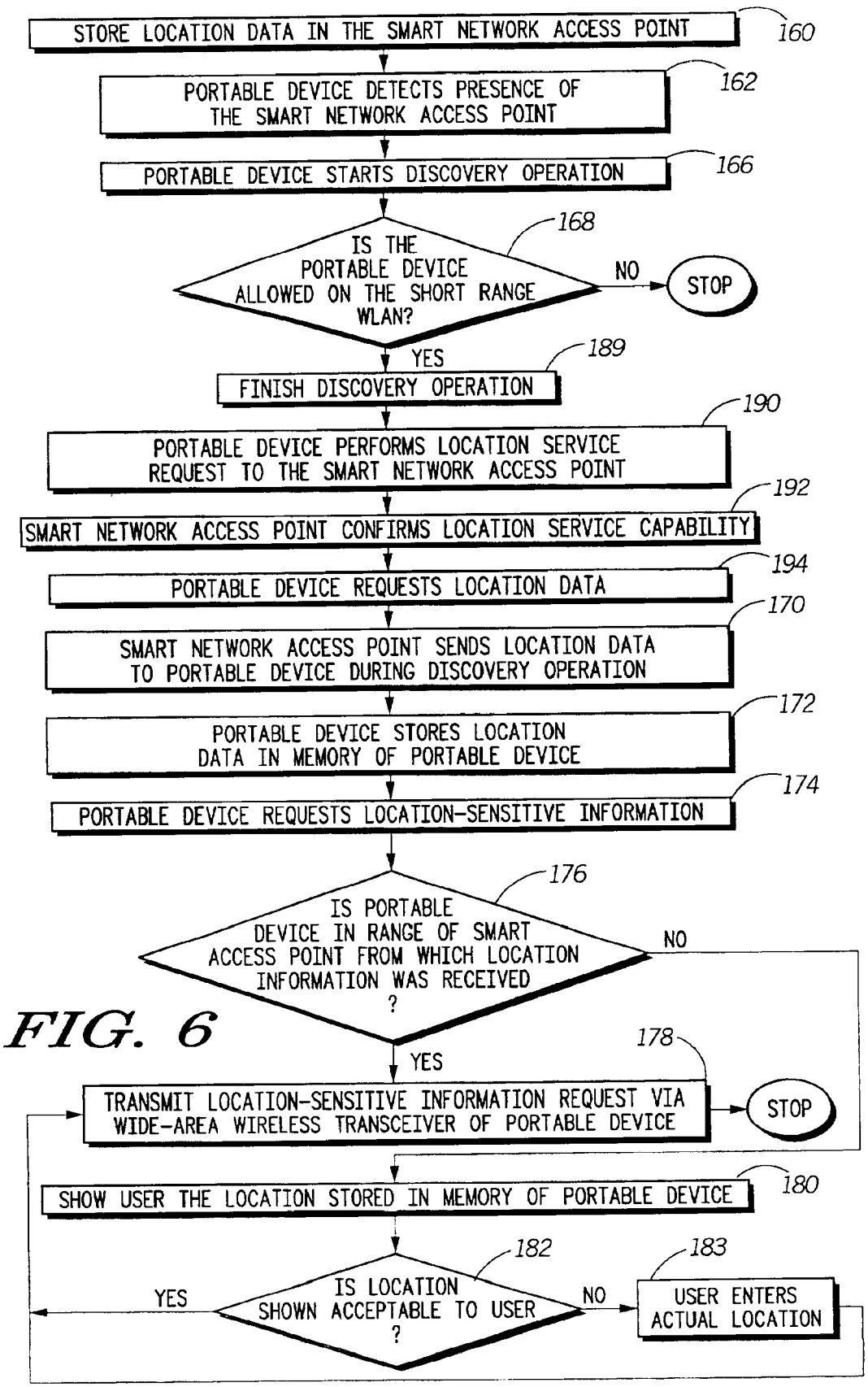

FIG. 6 is a flow diagram illustrating an alternative embodiment of the operation of the communication system of FIG. 1 in accordance with the present invention. The flow diagram of FIG. 6 describes interactions between the short range WLAN 114 and the portable device 100. The process begins with Step 160 wherein a plurality of location data is stored in the SNAP location information memory 146 of the smart network access point 130. The plurality of location data can be obtained by the smart network access point 130 for example by the SNAP processor 144 of the smart network access point 130 calculating the location position utilizing a plurality of GPS signals broadcast from a GPS system in a manner well known in the art. Alternatively, the location data comprises manually entered location coordinates of the smart network access point 130 or of the short range WLAN 114. It will be appreciated by one of ordinary skill in the art that other methods of obtaining location data by the smart network access point 130 can be utilized in accordance with the present invention.

Next, in Step 162, the portable device 100 detects the presence of the smart network access point 130. Next, in Step 166, the portable device 100 starts the discovery operation using the discovery routine stored in the discovery routine memory 124 of the portable device 100. Next, in Step 168, the process determines whether the portable device 100 is allowed on the short range WLAN 114. When the portable device 100 is not allowed on the short range WLAN 114, the process stops.

Alternatively, when the portable device 100 is allowed on the short range WLAN 114, the process moves to Step 189 wherein the portable device 100 completes the discovery operation. Next, in step 190, the portable device 100 performs a location service request to the smart network access point 130. Next, in Step 192, the smart network access point 130 confirms location service capability. Next in Step 194, the portable device 100 requests location data from the smart network access point 130. Next, the process moves to Step 170 wherein the smart network access point 130 sends location data to the portable device 100. Next, in Step 172, the portable device 100 stores the location data received in Step 170 in the location information memory 120 of the portable device 100. Next, in Step 174, the portable device 100 requests location sensitive information. Next, in Step 176, the process determines whether the portable device 100 is in the range of the smart network access point 130 from which the location data was received. When the portable device 100 is in the range of the smart network access point 130 from which the location data was received, the process moves to Step 178 wherein the portable device 100 transmits a location sensitive information request via the wide area wireless transceiver 104 to the wide area communication system 116. The process then stops. When the portable device 100 is not in the range of the smart network access point 130 from which the location data was received, the process moves to Step 180 wherein the location stored in the location information memory 120 is shown to the user of the portable device 100. For example, the location data can be displayed on the display 110. The process then moves to Step 182 wherein it is determined whether the location shown is acceptable to the user. For example, the user can accept the location using the user interface 108 of the portable device 100. When the location shown is not acceptable to the user, in Step 183, the user can manually enter a current location. Next, in Step 178 the portable device 100 transmits a location sensitive information request via the wide area wireless transceiver 104 to the wide area communication system 116. The process then stops. When the location shown is acceptable to the user in Step 182, the process moves to Step 178 wherein the portable device 100 transmits a location sensitive information request via the wide area wireless transceiver 104 to the wide area communication system 116. The process then stops.

In the manner described herein above, the portable device 100, which does not have on-board location-determining capability, advantageously can take advantage of the benefits of location sensitive software applications by obtaining location data from the short range WLAN 114.

Although the invention has been described in terms of preferred embodiments, it will be obvious to those of ordinary skill in the art that various alterations and modifications may be made without departing from the invention. Accordingly, it is intended that all such alterations and modifications be considered as within the spirit and scope of the invention as defined by the appended claims.

What is claimed is:

1. Within a communication system including a short range wireless local area network and a wide area communication system, a method for communicating a location sensitive information comprising:

storing a location coordinates of a smart network access point in the smart network access point within the short range wireless local area network;

notifying the smart network access point of the capability for wide area communication by the portable device;

sending the location coordinates to the portable device by the smart network access point;

requesting the location sensitive information associated with the location coordinates from the wide area communication system by the portable device sending a location sensitive information request in response to receiving the location coordinates, wherein the location sensitive information request includes the location coordinates; and obtaining the location sensitive information from the wide area communication system by the portable device.

2. The method for communicating a location sensitive information as recited in claim 1 further comprising:

determining whether the portable device is in the range of the smart network access point prior to the requesting step; and proceeding to the requesting step when the portable device is in the range of the smart network access point.

3. A method for communicating location sensitive information as recited in claim 2 further comprising:

notifying a device user of the location coordinates when the portable device is not in the range of the smart network access point in the determining step; and proceeding to the transmitting step when the location coordinates is acceptable to the device user.

4. A method for communicating location sensitive information as recited in claim 2 further comprising:

determining a time differential between the sending step and the requesting step when the portable device is not in the range of the smart network access point in the determining step;

comparing the time differential to a predetermined number; and proceeding to the requesting step when the time differential is less than the predetermined number in the comparing step.

5. A method for communicating location sensitive information as recited in claim 4 further comprising prior to the requesting step:

modifying the location coordinates to include a surrounding area in direct proportion to the difference between the time differential and the predetermined number when the time differential is greater than the predetermined number in the comparing step.

6. The method for acquiring a location sensitive information as recited in claim 4, wherein the location sensitive information request includes the time differential, the method further comprising:

modifying the location sensitive information by the wide area communication system using the time differential in response to receipt of the location sensitive information request.

7. The method for acquiring a location sensitive information as recited in claim 2, further comprising:

determining an elapsed time from a previous location when the portable device is not in the range of the smart network access point;

including the elapsed time from the previous location in the location sensitive information request; and modifying the location sensitive information by the wide area communication system using the elapsed time from the previous location in response to receipt of the location sensitive information request.

8. In a communication system including a short range wireless local area network and a wide area communication system, a method for communicating location sensitive information comprising:

storing a location data in a smart network access point within the short range wireless local area network;

detecting by a portable device the presence of the smart network access point;

performing a discovery operation;

determining whether the portable device is allowed on die short range wireless local area network;

sending a location service request from the portable device to the smart network access point when the portable device is allowed on the short range wireless local area network;

confirming location service capability by the smart network access point;

requesting location data by the portable device to the smart network access point;

sending location data from the smart network access point to the portable device;

determining whether the portable device is in the range of the smart network access point;

transmitting a location sensitive information request to the wide area communication system from the portable device when the portable device is in the range of the smart network access point, wherein the location sensitive information request includes the location data; and obtaining the location sensitive information associated with the location data from the wide area communication system from the portable device.

9. A method for communicating location sensitive information as recited in claim 8 further comprising:

notifying a device user of the location data when the portable device is not in the range of the smart network access point prior to the transmitting step; and proceeding to the transmitting step when the location data is acceptable to the device user.

10. A portable device for receiving location sensitive information comprising:

a short range wireless transceiver for communicating within a short range wireless local area network, wherein the short range wireless transceiver is adapted to receive a location data from the short range wireless local area network;

a wide area wireless transceiver for communicating within a wide area communication system; and a processor coupled to the short range wireless transceiver and to the wide area wireless transceiver, wherein the processor is programmed to:

receive the location data from the short range wireless transceiver, determine a location of the portable device in response to receiving the location data, and send a command to the wide area wireless transceiver including the location, wherein the wide area wireless transceiver is further adapted to:

requests the location specific information associated with the location from the wide area communication system in response to the command, and obtain the location specific information associated with the location from the wide area communication system, and wherein the processor is further adapted to:

utilize the obtained location specific information within one or more location sensitive software applications.

11. A portable device for communicating location specific information as recited in claim 10 further comprising:

a memory coupled to the processor for storing the location data.

12. A portable device for communicating location sensitive information as recited in claim 10 further comprising:

a display coupled to the processor for notifying a device user of the location; and a user interface coupled to the processor for sending a command to the processor when the device user accepts the location.

* * * * *